United States Patent [19]

Rudy

[11] 4,124,117
[45] Nov. 7, 1978

[54] APPARATUS FOR REPRESSURING TENNIS AND SIMILAR PLAY BALLS

[76] Inventor: Marion F. Rudy, 19001 Vintage St., Northridge, Calif. 91324

[21] Appl. No.: 842,060

[22] Filed: Oct. 14, 1977

[51] Int. Cl.² .................... B65D 81/20; B65D 85/00
[52] U.S. Cl. ........................... 206/213.1; 206/315 B
[58] Field of Search ................. 206/205, 213.1, 315 B; 273/61 D; 426/124, 418–419, 591

[56] References Cited

U.S. PATENT DOCUMENTS

| | | | |
|---|---|---|---|
| 1,207,813 | 12/1916 | Stockton | 206/315 B X |
| 1,755,017 | 4/1930 | Nerre | 206/213.1 |
| 1,909,013 | 5/1933 | Ruzicka | 206/205 |
| 2,270,593 | 1/1942 | Kurath et al. | 206/209 |
| 2,719,660 | 10/1955 | Ellis | 206/213.1 X |
| 3,559,562 | 2/1971 | Carlson et al. | 426/124 |
| 3,741,378 | 6/1973 | Parker | 206/209 |

Primary Examiner—Steven E. Lipman
Attorney, Agent, or Firm—Bernard Kriegel

[57] ABSTRACT

Apparatus for repressuring a tennis ball or similar play ball, which has lost a portion of its initial inflation pressure, in which a container or enclosure for the ball contains a chemical and a suitable fluid that reacts with the chemical to generate a gas at atmospheric pressure capable of diffusing through the permeable elastomeric material of the ball to elevate the total pressure within the ball toward its initial pressure value.

11 Claims, 3 Drawing Figures

APPARATUS FOR REPRESSURING TENNIS AND SIMILAR PLAY BALLS

The present invention relates to apparatus for repressuring inflated tennis balls, and similar play balls, which have lost a substantial portion of their initial pressure, because of diffusion of the gas initially within the balls outwardly through the permeable elastomeric member or body of the ball.

Most tennis and similar balls used throughout the world contain air or nitrogen under a pressure of approximately 8 to 14 psig. They are packaged in sealed air pressurized cans, with the pressure being higher than that in the balls. As an example, the air pressure within the cans is about 15 to 18 psig, with the initial pressure in the balls being about 14 psig. Proper air pressure within the balls gives them required characteristics of bounce and resiliency, and enables them to meet performance specifications established by regulatory agencies, such as the International Lawn Tennis Association.

Once the balls are removed from the pressurized can, the air or other gas within each ball diffuses outwardly through its permeable body member rather quickly, the balls going "dead" and losing much of their bounce. Several devices have been proposed for restoring, at least partially, the pressure in the balls. A number of the devices involve placing the balls in a suitable air-tight container, and then pressurizing the container, as by means of small hand-operated pumps. Another device employs lids which generate pressure when screwed onto the container, while a further device includes a screw jack mechanism for reducing the container volume. Although the foregoing devices repressure the balls, they are somewhat unwieldy to carry and operate and are slow in returning the balls to the proper elevated pressure.

Another device for effecting repressurization of the ball includes a hollow needle to puncture the ball, through which air or other gas under pressure is forced into the ball. This approach requires a sealant to close the hole made in the ball when the needle is withdrawn, which is messy, affects the weight and balance of the ball, and contributes to leaks.

With the present invention, the balls can be repressurized without requiring the pressure in the ball container or canister to be increased above atmospheric. Moreover, it is not necessary to puncture the ball with a hollow needle, or the like.

In general, the invention includes a suitable container into which one or more balls are placed that require reinflation. A gas is produced or placed in the container which can be at atmospheric pressure, preferably displacing the air in the container, so that the gas can diffuse through the permeable elastomeric body of the ball and increase the pressure therein toward the pressure to which it was inflated intially. Preferably, a quantity of an appropriate chemical which decomposes in the presence of water or water vapor is disposed in the container or canister which results in evolution of a suitable gas/vapor or gases/vapors, which are preferably clean, odorless and harmless, and which have relatively high permeability coefficients, in order to diffuse effectively through the permeable elastomeric body of the balls into their interiors. The quantity of chemicals and water in the container is selected so that the elevated total pressure in the balls will not exceed the maximum value suitable for use in playing tennis, or other play ball activity.

The increase in pressure is believed to be due to the presence of two or more different gases in the ball, the total pressure in the ball being the sum of the partial pressure of the gas originally placed in the ball and the partial pressure of the other gas that diffuses into the ball.

An object of the present invention is to provide apparatus capable of reinflating tennis and similar balls in a simple, inexpensive, safe, clean and expeditious manner.

Another object of the invention is to reinflate tennis balls, and the like, without the necessity for mechanically invading the balls themselves.

A further object of the invention is to provide apparatus for reinflating balls without the necessity of increasing the pressure in the container for the balls above atmospheric.

This invention possesses many other advantages, and has other objects which may be made more clearly apparent from a consideration of a form in which it may be embodied, and which is shown in the drawings accompanying and forming part of the present specification. This form will now be described in detail for the purpose of illustrating the general principles of the invention; but it is to be understood that such detailed description is not to be taken in a limiting sense.

Referring to the drawings.

Figure 2:
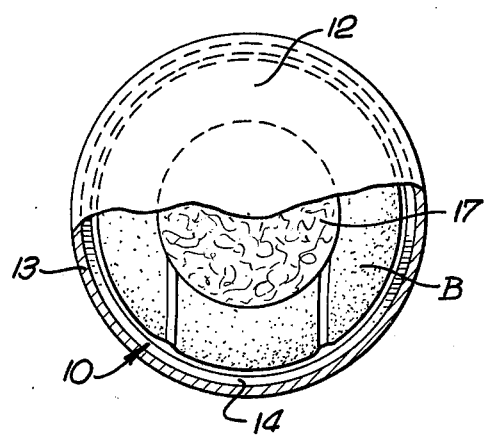
FIG. 2 is a top plan view of the apparatus, with a portion of the top broken away.
Figure 1:
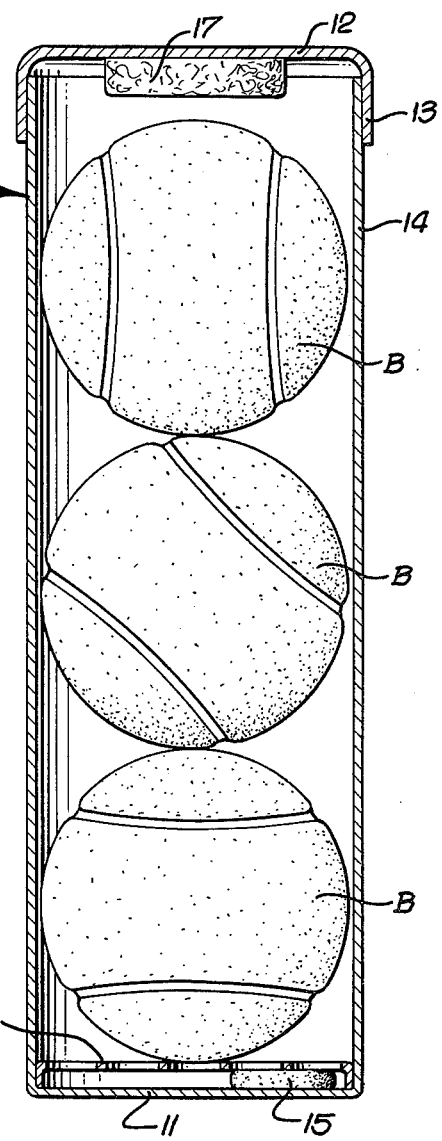
FIG. 1 is a longitudinal section through an apparatus embodying the invention.

As disclosed in the drawing, an elongated cylindrical canister or container 10 is provided having a bottom wall 11 and a suitable top or lid 12 removably mounted on the upper end portion of the container, the top having a depending skirt 13 surrounding the upper portion of the container wall 14. The top or lid need not make a tight seal with the container wall, to enable the interior of the container to remain at atmospheric pressure. If desired, the lid may have holes or be made from porous materials. The lid may be made imperforate and non-porous, making an air-tight fit with the container wall 14, but such arrangement is not necessary to the practice of the present invention.

As disclosed, a suitable gas generating chemical 15 is disposed in the bottom portion of the container, the chemical, if desired, being retained in the bottom portion by a perforated disc or separation 16, which may be made of a plastic material, or light gauge sheet metal. The lower ball B rests upon the separater 16. A sponge 17 is suitably affixed to the under surface of the lid or top 12 of the container for the purpose of retaining a desired quantity of liquid, such as water.

In use of the apparatus, the balls B requiring repressurization are placed in the container 10 with a suitable quantity of chemicals 15 disposed therein below the separater. The sponge 17 is then moistened with water and the top 12 placed on the upper portion of the container. The water vapor issuing from the sponge migrates to the bottom of the container, passing through the separater perforations and reacting with the chemicals 15, causing the evolution of a gas or vapor, which fills the container. A preferred gas to be produced is carbon diocide, since it is inexpensive and odorless, and has a relatively high permeability coefficient, as well as being heavier than air. As the carbon dioxide gas is evolved, it lifts the air in the container upwardly which passes out of the container between skirt 13 and container walls 14. If a porous or perforated lid is used, the displaced air pumps through the top itself. Under both conditions, the container becomes filled with carbon dioxide gas.

Upon the container becoming filled with carbon dioxide, its partial pressure is high, being at atmospheric pressure (14.7 psia) compared with the partial pressure of carbon dioxide within the tennis balls, which initially, will be zero, since the balls will contain initially the air, nitrogen, or other gas only, with which they have been initially inflated. The carbon dioxide gas at atmospheric pressure diffuses relatively quickly through the permeable elastomeric bodies of the ball, elevating their total internal pressure and restoring their bounce, resiliency and vitality.

Figure 3:
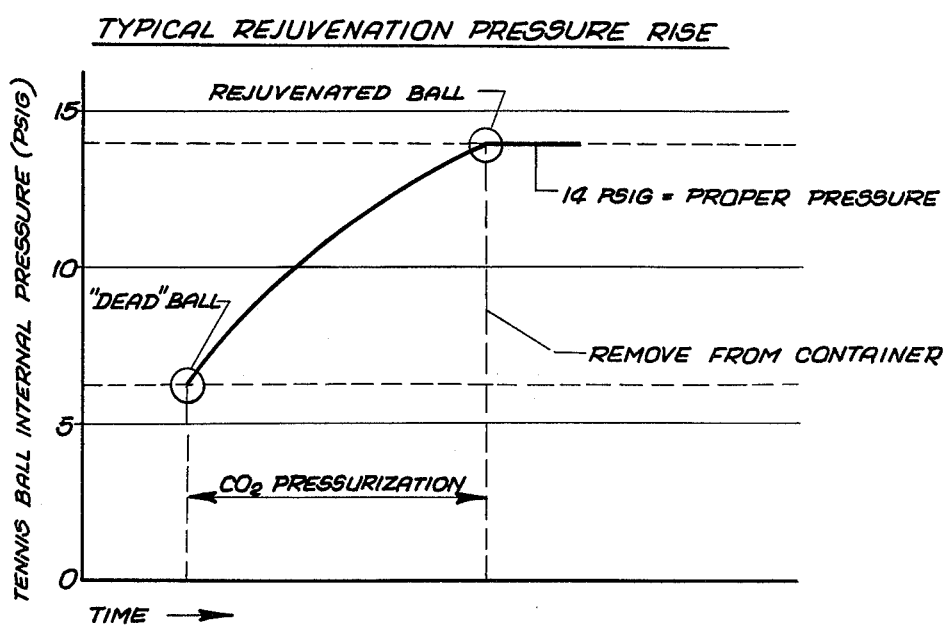
FIG. 3 is a graph representing the increase in pressure within a tennis ball achieved through the use of the invention.

The inward diffusion of the gas, or self-pressurization, is represented in the graph FIG. 3, which shows a typical pressure rise. In that figure a "dead" ball is represented, which was placed in the container and which had internal pressure of about 6.5 psig. The carbon dioxide in the container was at atmospheric pressure and diffused through the elastomeric ball into its interior, the pressure in the ball rising over a period of time to the desired value, which, as shown in FIG. 3, was about 14 psig, after which the ball B was removed from the container 10 to prevent the internal ball pressure from rising above the desired value. Several hours may be required to effect repressurization of the ball to a desired extent.

The chemicals 15 placed in the bottom of the container may be a mixture of citric acid and sodium bicarbonate, which is inexpensive, odorless and readily available, reacting with the water or water vapor emanating from the sponge 17 to produce adequate quantities of carbon dioxide. Other carbon dioxide producing chemicals may be used, such as tartaric acid and sodium bicarbonate. The rate of generation of carbon dioxide gas is controlled by the amount of moisture which reaches the vicinity of the chemicals. The quantity of carbon dioxide gas produced is a function of the length of time that the moisture is in proximity to the chemicals. It has been found that a small damp spong located near the top of the container will provide sufficient moisture generation to cause an appropriate rate of carbon dioxide gas to evolve from the chemicals located at the bottom of the container.

The preferred approach for controlling the level to which the tennis balls, or other play balls, are self-pressurized is to regulate the quantity of water in the container, rather than the quantity of chemicals. In addition, sufficient chemicals should be present initially in the container to repressurize several batches of balls. The apparatus becomes activated when the moisture is introduced and it continues to function until all of the water is consumed. The sponge is preferably designed to provide the correct amount of moisture to allow the apparatus to operate just long enough to repressurize the balls to the proper level. Accordingly, over-pressurization is avoided.

An overnight cycle of operation is usually sufficient to self-pressurize balls which have been used during the preceding day. After two to three hours of intensive play, the tennis balls lose about 2 to 2½ psi pressure. An overnight charging cycle can restore approximately ½ to 1½ psi of the lost pressure to the balls. After several days of hard play, following each night by a repressurization cycle, the balls will still be within about 2 psi of the optimum value to which the balls were initially pressurized, which is usually 14 psig. Without pressurization, the balls would fail to meet the standards of the International Lawn Tennis Association.

Longer cycles of repressurization are required, of course, if the balls are allowed to lose pressure for long periods of time. For example, after 3 days, the balls can lose 3 to 4 psi in pressure, and after 2 to 3 weeks, the pressure loss can be as high as 8 to 9 psi. To elevate the pressure in those cases, it is necessary to either remoisten a single sponge after about each 8 to 10 hours, or provide auxiliary sponges in the device that can be moistened as needed for longer term pressurization cycles.

Small quantities of chemicals and moisture are adequate to repressurize the balls. If the apparatus is designed to accommodate three balls, the volume of the empty container is approximately 35 cubic inches. Approximately 4.0 grams of a mixture of 45% citric acid and 55% sodium bicarbonate will generate enough carbon dioxide gas to fill the canister containing the balls. This is sufficient gas to repressurize the balls with a control release of carbon dioxide during an overnight charging cycle.

The quantity of chemicals can be provided in tablet form, each tablet being comparatively small, of the order of about 1 inch in diameter and ⅛ inch thick. The quantity of water to completely decompose such chemicals is also small, weighing about 0.014 ounces (1/10th to ½ teaspoon of water). Such small quantities of water are readily contained within a small sponge. With carbon dioxide gas being used in the apparatus, which is heavier than air, the top of the container can remain open or closed by the lid 12, which may be of any suitable type, including a screw-on lid. The top need not be air-tight if used, but if it is air-tight, the carbon dioxide pressure will build up somewhat within the container to exceed atmospheric pressure. Repressurization of the balls will then be speeded up somewhat, but not significantly, since the pressures used in the device are atmospheric, or slightly above atmospheric, inexpensive lightweight containers can be used. However, a simple plastic bag will function if made from a gas barrier-type material, such as PVDC or Saran. The balls need merely be placed in the bag, together with the chemicals and moisture, with the bag being fastened loosely at the top, as with a string.

In lieu of the sponge and chemicals, carbon dioxide can be placed directly into the container, such gas diffusing through the ball elastomeric member into its interior, elevating the pressure therewithin. Other gases will also operate to repressurize the ball by means of their diffusion through the permeable body of the ball to its interior. The main requirements of the gas are that it be different from the gas inside the ball, and that the rate of activated diffusion through the elastomeric wall of the ball of the gas surrounding the ball be greater than the gas or gases within the ball. Representative gases include trichlorofluoromethane (Freon 11), dichlorodifluoromethane (Freon 12), chlorodifluoromethane (Freon 22), methane, ammonia, nitrous oxide, hydrogen sulfide, helium, hydrogen and acetylene. These gases can also be placed or injected into the container and will diffuse through the elastomeric ball member into its interior to produce a controllable degree of pressure increase within the ball.

The reaction between other chemicals than those previously mentioned and liquids will also operate to effect production of a pressurizing gas. As an example, calcium carbide may be placed in the bottom of the container and the sponge 17 moistened with water, the reaction between the two producing acetylene, which has a faster diffusion rate than carbon dioxide and will, therefore, penetrate the elastomeric body of the ball more readily and pass into its interior. However, it is preferred to generate carbon dioxide gas through the reaction of sodium bicarbonate and water, because of the safety factor, absence of odor and minimal expense involved.

I claim:

1. Apparatus for repressuring hollow permeable plays balls inflated by a first gaseous medium to above atmospheric pressure, comprising a container for receiving one or more of the balls, the interior of said container being at atmospheric pressure, and a means for providing a second gaseous medium in said container externally of one or more of the balls, the second gaseous medium being capable of diffusing through said one or more permeable balls to increase the pressure therein, said means being at atmospheric pressure and said second gaseous medium being differemt from said first gaseous medium.

2. Apparatus as defined in claim 1, said second gaseous medium being such that its rate of diffusion from said container into said one or more balls is greater than the rate of diffusion of said first gaseous medium through said one or more balls to the exterior thereof.

3. Apparatus as defined in claim 1, said second gaseous medium being heavier than air.

4. Apparatus as defined in claim 1, said second gaseous medium being carbon dioxide.

5. Apparatus as defined in claim 1, said means for providing said second gaseous medium being reactive chemicals in said container externally of said balls.

6. Apparatus as defined in claim 5, one of said chemicals being a carbonate, another of said chemicals being water capable of reacting with said carbonate to produce carbon dioxide.

7. Apparatus as defined in claim 6, said carbonate being sodium bicarbonate.

8. Apparatus as defined in claim 5 a sponge in said container adapted to be moistened with one of said chemicals.

9. Apparatus as defined in claim 5, one of said chemicals being at the bottom portion of said container, a perforate member in said container above said one chemical to separate said one or more balls from said one chemical, and means for supporting another of said chemicals in the upper portion of said container.

10. Apparatus as defined in claim 9, said container including a removable top, said support means comprising a sponge secured to said top.

11. Apparatus as defined in claim 10, said one chemical including sodium bicarbonate, said another chemical being water moistening said sponge.

* * * * *